United States Patent [19]

Abusleme et al.

[11] Patent Number: 5,463,006
[45] Date of Patent: Oct. 31, 1995

[54] THERMOPROCESSABLE COPOLYMERS OF TETRAFLUOROETHYLENE

[75] Inventors: Julio A. Abusleme, Saronno; Pasqua Colaianna, Milan, both of Italy

[73] Assignee: Ausimont, S.p.A., Milan, Italy

[21] Appl. No.: 273,266

[22] Filed: Jul. 1, 1994

[30] Foreign Application Priority Data

Jul. 5, 1993 [IT] Italy .................. MI93A1444

[51] Int. Cl.⁶ .................................. C08F 214/26
[52] U.S. Cl. ............................. 526/247; 526/206
[58] Field of Search ............................ 526/247

[56] References Cited

U.S. PATENT DOCUMENTS

| | | |
|---|---|---|
| 2,946,763 | 7/1960 | Bro et al. . |
| 3,635,926 | 1/1972 | Carlson . |
| 4,013,689 | 3/1977 | Martini . |
| 4,029,868 | 6/1977 | Carlson . |
| 4,587,316 | 5/1986 | Nakagawa et al. . |
| 4,864,006 | 9/1989 | Giannetti et al. . |
| 4,906,770 | 3/1990 | Marchionni et al. . |

FOREIGN PATENT DOCUMENTS

| | | |
|---|---|---|
| 0075312 | 3/1983 | European Pat. Off. . |
| 0130052 | 1/1985 | European Pat. Off. . |
| 0184459 | 6/1986 | European Pat. Off. . |
| 0247379 | 12/1987 | European Pat. Off. . |
| 1106344 | 3/1968 | United Kingdom . |
| 1514700 | 6/1978 | United Kingdom . |

OTHER PUBLICATIONS

European Search Report, dated Oct. 4, 1994 of EP 94 10 9780.

*Primary Examiner*—Joseph L. Schofer
*Assistant Examiner*—N. Sarofim
*Attorney, Agent, or Firm*—Bryan Cave

[57] ABSTRACT

The invention relates to new thermoprocessable tetrafluoroethylene copolymers particularly suitable for coating electric cables by melt extrusion. These copolymers consist of:

(a) from 0.5 to 13% by weight of perfluoromethylvinylether;

(b) from 0.05 to 3% by weight of one or more monomers selected in particular classes of linear perfluoroalkylvinylethers containing one or more ether oxygen atoms, of perfluorovinylethers containing a cycle having 6 atoms and having one or more ether oxygen atoms, and of alphafluoroalkylethylenes;

(c) tetrafluoroethylene, in such an amount that the sum of the percentages of the various monomers is equal to 100% by weight.

4 Claims, No Drawings

THERMOPROCESSABLE COPOLYMERS OF TETRAFLUOROETHYLENE

The present invention relates to new thermoprocessable tetrafluoroethylene (TFE) copolymers, particularly suitable for coating electric cables by melt extrusion.

FEP copolymers (tetrafluoroethylene-hexafluoropropene copolymers) are known, having a melting temperature of about 260°–265° C. and endowed with relatively good mechanical properties up to a temperature of 200° C., as described for instance in U.S. Pat. No. 2,946,763. It is known that, for the processing of thermoprocessable polymers by extrusion, a low melt viscosity is required, i.e. a high melt flow index. A reduction of viscosity leads to a decay of the mechanical properties. To attenuate this effect, copolymers having a higher percentage of hexafluoropropene (HFP) are prepared. However, the use of a higher percentage of this comonomer implies a sharp reduction of the melting point and therefore a lower rating temperature.

U.S. Pat. No. 4,029,868 illustrates another kind of FEP copolymers containing, besides TFE and HFP, from 0.5 to 3% by weight of a third monomer consisting of perfluoropropylvinylether or perfluoroethylvinylether. These terpolymers have a viscosity lower than the FEP copolymers containing only TFE and HFP.

Nevertheless, mechanical properties at high temperature (200° C.) remain still acceptable. According to the same patent above, perfldoromethylvinylether is not suitable as third monomer (see, in particular col. 3, lines 38–39 and comparative example A).

U.S. Pat. No. 4,587,316 suggests the use, as third monomer, of perfluoroalkylvinylethers wherein the perfluoroalkyl group contains an even higher number of carbon atoms: from 4 to 10.

Typically, a FEP terpolymer containing about 6% by mols of hexafluoropropene and about 0.4% by moles of perfluoropropylvinylether and having a melt index of about 18–20 shows the following properties:

—melting temperature: about 260° C.;

—stress at break at 200° C.: about 4 MPa;

—yield stress at 200° C.: about 3 MPa;

—flex life: about 2,200;

—creep strain at 150° C. for 10 hours with a 2.4 MPa load: about 11.

The methods for determining these properties will be described hereinafter.

Generally, superior mechanical properties are obtained with TFE/perfluoroalkylvinylether copolymers, in particular with perfluoropropylvinylether, as described in U.S. Pat. No. 3,635,926, independently from the melt viscosity.

The performances of this class of copolymers improve as the number of carbon atoms of the perfluoroalkylvinylether alkyl group increases, even though the reactivity decreases when the perfluoroalkyl segment length increases, still remaining, however, more reactive than the corresponding alpha-alkyl-perfluoroolefins.

The low reactivity of perfluoropropylvinylether leads to a decrease in the productivity of the polymerization reactor, with negative consequences on the production costs, and requires recovery of the unreacted monomer when the reaction is over (see for instance British Patent 1,514,700). Also this drawback makes the process for producing TFE copolymers with perfluoropropylvinylether and other perfluorovinylethers with even longer perfluoroalkyl chain more expensive.

Therefore, the need of finding new combinations of fluorinated monomers is particularly felt, which, on one hand, could be a clear improvement with respect to FEP copolymers and terpolymers and, on the other hand, preserve a set of properties comparable to those, for instance, of the copolymers of tetrafluoroethylene with perfluoropropylvinylether, remedying at the same time the shortcomings described above.

It has now been surprisingly found that thermoprocessable TFE copolymers with definite amounts of perfluoromethylvinylether and of one or more fluorinated comonomers which will be described hereinbelow, are unexpectedly endowed with a very good combination of thermal and mechanical properties at high temperatures (even at 250° C.) and of stress resistance, making them particularly suitable for coating electric cables by melt extrusion. The superior properties of these copolymers are particularly unexpected since the performances of thermoprocessable tetrafluoroethylene (TFE) copolymers with perfluoromethylvinylether alone are clearly inferior to those of the TFE-perfluoropropylvinylether copolymers. A particular advantage of these copolymers, object of the present invention, derives from the fact that perfluoromethylvinylether results, in the copolymerization with TFE, by far more reactive than both perfluoroalkylvinylethers with a perfluoroalkyl chain having a higher number of carbon atoms and hexafluoropropene.

In the description of the present invention, the word "copolymer" is used to designate—depending on the circumstances—copolymerization products of 2, 3, 4 or more monomers.

A first object of the present invention is therefore to provide new thermoprocessable TFE copolymers which overcome the shortcomings encountered in preparing and using the TFE copolymers of the prior art.

A further object is to provide new thermoprocessable TFE copolymers suitable, in particular, for coating electric cables by melt extrusion.

These and other objects are achieved by thermoprocessable tetrafluoroethylene (TFE) copolymers, which consist of:

(a) from 0.5 to 13% by weight of perfluoromethylvinylether;

(b) from 0.05 to 3% by weight of one or more fluorinated monomers selected from the group consisting of:

(1)

$$R^1O-CF=CF_2 \qquad (I)$$

wherein $R^1$ is selected from:

i) —$R_F$—T wherein $R_F$ is a perfluoroalkylene radical having from 2 to 12 carbon atoms and T is F, Cl or H;

ii)

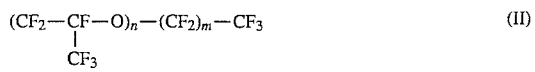

$$(CF_2-CF-O)_n-(CF_2)_m-CF_3 \qquad (II)$$
$$\;\;\;\;\;\;\;\;|$$
$$\;\;\;\;\;\;CF_3$$

wherein n is a number from 1 to 4, and m is a number from 0 to 3;

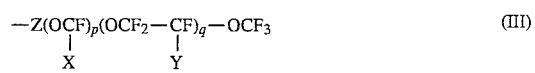

$$-Z(OCF)_p(OCF_2-CF)_q-OCF_3 \qquad (III)$$
$$\;\;\;\;\;\;|\;\;\;\;\;\;\;\;\;\;\;\;\;\;\;\;|$$
$$\;\;\;\;\;X\;\;\;\;\;\;\;\;\;\;\;\;\;\;Y$$

wherein the

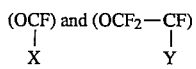

units are randomly distributed along the chain;

X and Y are, independently from each other, —F or —CF$_3$;

Z is —(CFX)— or —(CF$_2$—CFY)—;

p and q, equal or different from each other, are numbers from 0 to 10;

the average number molecular weight of the monomer being from 200 to 2,000;

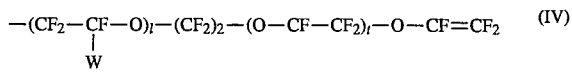

wherein W is —Cl, —F or —CF$_3$, and l and t are numbers from 0 to 5;

v)

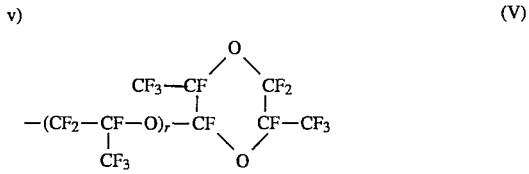

wherein r is a number from 0 to 4;

(2)

$$R^2\text{--}CH\text{=}CH_2, \qquad (VI)$$

wherein $R^2$ is a $R_F$—T group where $R_F$ is a perfluoroalkylene radical having from 2 to 12 carbon atoms, and T is F, Cl or H;

c) tetrafluoroethylene, in such an amount that the sum of the percentages of the various monomers is equal to 100% by weight.

The preferred percentages by weight of the three types of monomers is the following:

—perfluoromethylvinylether: 2–9%;

—one or more fluorinated monomers (b): 0.1–1.5%;

—tetrafluoroethylene: difference to 100%.

In the comonomers of type (1) (i), the perfluoroalkylene radical preferably contains from 2 to 6 carbon atoms and the T atom is, preferably, a fluorine atom. Among the comonomers of type (1) (i), perfluoroethylvinylether, perfluoropropyl vinylether and perfluorobutylvinylether can be mentioned as examples. The preferred comonomer of this class is perfluoropropylvinylether.

The comonomers of type (1) (ii) are described, for instance, in European patent application No. 75,312. Examples of these comonomers are those wherein n is equal to 1 or 2 and m is equal to 2.

The comonomers of type (1) (iii) are obtained by dechlorination of the compounds of formula

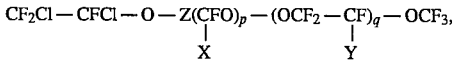

which can be prepared as described in example 11 of U.S. Pat. No. 4,906,770.

The comonomers of type (1) (iv) can be prepared according to the method described in British Patent No. 1,106,344. Among these comonomers the compound $$CF_2\text{=}CF\text{---}O\text{---}(CF_2\text{-}CF_2)\text{---}O\text{---}CF\text{=}CF_2 \qquad (VI)$$

can be cited.

The comonomers of type (1) (v) can be prepared according to the method described in U.S. Pat. No. 4,013,689.

In the comonomers of formula $R^2$—CH=CH$_2$, $R^2$ has preferably from 2 to 6 carbon atoms. Examples of these comonomers are perfluorobutylethylene and perfluorohexylethylene.

The above described comonomers can be copolymerized with TFE and perfluoromethylvinylether alone to give terpolymers, or in combination with each other to give tetrapolymers or copolymers with more complex compositions.

The thermoprocessable copolymers object of the present invention can be prepared by radical polymerization either in aqueous medium or in organic medium.

The polymerization in aqueous medium can be carried out as follows. The polymerization initiator can be any substance capable of producing radicals such as, for instance, a peroxide, a percarbonate, a persulphate or an azocompound. Generally, these compounds have, in the reaction conditions, an average lifetime sufficient to maintain the reaction and to obtain the desired molecular weight. A reducing agent as promoter for the initiator decomposition, such as an iron salt, can optionally be added.

The amount of initiator to be used depends, as known, on the reaction temperature, on the possible presence of chain transfer agents, on the desired molecular weight value, and generally on the reaction conditions.

Moreover, the polymerization in aqueous medium needs the presence of a surfactant, such as a perfluoroalkyl carboxylic acid salt (for instance ammonium perfluorocaprylate). Other suitable compounds are perfluoroalkoxybenzensulphonic acid salts, as described, for instance, in European patent application No. 184,459.

Optionally, substances which are able to dissolve the monomers and possibly the initiator are added to the aqueous medium. These solvents can be, for instance, 1,1,2-trichloro-1,2,2-trifluoroethane, 1,2-dichloro-1,1,2,2-tetrafluoroethane, trichlorofluoromethane, dichlorodifluoromethane, CClF$_2$H and perfluorocyclobutane.

It is particularly advantageous to carry out the polymerization in aqueous phase in the presence of perfluoropolyethers. They can be added to the reaction medium in the form of aqueous emulsion in the presence of a suitable dispersing agent as described in European patent application No. 247,379 or, preferably, in the form of aqueous microemulsion, as described in U.S. Pat. No. 4,864,006.

Alternatively, the polymerization can be carried out in a liquid organic medium, as described for instance in U.S. Pat. No. 3,642,742. Any initiator for polymerizing TFE in an organic medium can be employed. Preferably, the initiator is soluble in the reaction solvent. Examples of suitable initiators are alkylpercarbonates and perfluoroacylperoxides.

The comonomers are generally introduced into the reactor in the form of gaseous mixture. An advantageous way of carrying out the polymerization consists in introducing into the reactor the third monomer (i.e. the comonomer (b) in the gaseous reaction mixture) only at the reaction start, keeping constant the reaction pressure by further addition of the TFE/perfluoromethylvinylether gaseous mixture. An advantage of this technique is that the third monomer added at the reaction start has completely reacted when the desired polymer concentration is reached. This results particularly advantageous both for technical and economical reasons. In fact, the third monomer employed in the process generally is very expensive, therefore it would be necessary to recover the unreacted monomer when the reaction is over. The particular procedure adopted in the present invention, on one hand makes unnecessary a recovery process of the monomer, and, on the other hand, maximizes the efficiency of the incorporation of such monomer in the polymer chain.

The characteristics and the performances of the copolymers of the present invention were determined as follows. The melt viscosity was measured according to ASTM D-1238-52T standard, using a modified equipment in which cylinder, nozzle and piston are made of corrosion resistant steel. 5 g of the sample were introduced into the cylinder having an 9.53 mm internal diameter, kept at 372±1° C. After 5 minutes, the molten polymer was extruded through a capillary having a 2.10 mm diameter and a 8.0 mm length, applying a 5 kg load (piston+weight), which corresponds to a shear stress of 0.457 kg/cm². The melt viscosity, expressed in poise, was calculated from the equipment configuration and was obtained dividing 53150 by the observed extrusion rate, expressed in grams per minute.

The copolymer composition was determined by mass balance.

The melting temperature was determined by Differential Scanning Calorimetry (DSC), using a Perkin-Elmer calorimeter Mod. IV. About 10 mg of the sample to be analyzed were heated from room temperature to 350° C. with a 10° C./min rate. The sample was kept at 350° C. for 5 min, and then cooled to room temperature with a 10° C./min rate. The heating to 350° C. was repeated with the same modalities. During this step, the temperature corresponding to the maximum of the melting endotherm curve was registered and indicated as "second melting temperature" [$T_m(II)$].

The thermal stability of the obtained polymers was determined by Thermo Gravimetric Analysis in a Perkin-Elmer TGA Mod. 7 apparatus, operating isothermally at 380° C. in air. The weight loss, expressed as percentage, after one hour is an index of the thermal stability of the material.

For measuring tensile properties (tensile stress and elongation at break, yield stress, yield elongation and Young modulus), some plaques having a 1.58±0.08 mm thickness were prepared by compression molding, according to ASTM D-3307-81 standard. Micro-specimens were obtained therefrom to measure mechanical properties according to ASTM D-1708 standard. In all these measurements, the stretching rate was 50 mm/min. Usually, for each polymer sample, 3 measurements were carried out, at room temperature, at 200° C., and at 250° C. When working at high temperatures, the specimen was kept at the test temperature for 5 min before the measurement.

To determine the stress resistance, the standard equipment described in ASTM D-2176-63T for the MIT Flex Life was used. The measurement was carried out on specimens obtained from a 0.3 mm thick film. The specimen was gripped in the jaws of the equipment and a 1 kg weight was applied thereto. The film was bent to a 135° angle rightward with respect to the vertical line and with the same angle leftward, with a rate of 175 cycles per minute. The number of cycles necessary to achieve the breakage of the specimen was registered. On each sample six measurements were carried out, and the average value was reported.

The creep strain was determined at 150° C. for 10 hours with a 2.4 MPa load, according to ASTM 2990 standard.

EXAMPLE 1

A 22 liter AISI 316 steel autoclave, provided with a mechanical stirrer working at 450 rpm, was employed. After evacuation, there were introduced in sequence: 14.7 l of demineralized water, $CHCl_3$ as chain transfer agent in an amount of 0.75 ml/l$_{H2O}$, perfluoropropylvinylether (FPVE) in an amount of 4.1 g/l$_{H2O}$, and eventually an aqueous perfluoropolyether microemulsion prepared according to Example 1 of U.S. Pat. No. 4,864,006 so as to have a surfactant concentration of 2 g/l$_{H2O}$. The autoclave was heated to 75° C. A TFE/perfluoromethylvinylether (FMVE) gaseous mixture, with a molar ratio TFE/FMPVE equal to 37,5/1, was added by means of a compressor until a pressure of 20 absolute bar was reached. The composition of the gaseous mixture in the autoclave was analyzed by gas chromatography. At the beginning, it had the following composition (% by moles): 83.7% TFE, 11.6% FMVE, and 4.0% FPVE; then, by means of a dosing pump, a 0.011 molar solution of potassium persulphate with a flow rate of 170 ml/hour, was fed continuously. The polymerization pressure was kept constant by feeding the above monomer mixture, and when 6600 g had been fed (after about 240 min of reaction), the reaction was stopped. The composition of the final gaseous phase was the following (% by moles): 87.4% TFE, 12.3% FMVE; 0.3% FPVE. The reactor was cooled to room temperature; the emulsion was discharged and coagulated by addition of $HNO_3$ (65%). The polymer was separated, washed with water, dried at 220° C., and pelletized. Table 1 reports the data relating to the polymer characterization.

EXAMPLE 2

It was operated, as in Example 1, except that the amount of chain transfer agent introduced into the reactor was 0.95 ml/l$_{H2O}$, and that the monomer gaseous mixture fed during the whole reaction had a molar ratio TFE/FMVE of 27.6/1. Before starting the reaction, the gaseous phase had the following composition (% by moles): 77.8% TFE, 17.2% FMVE, 5.0% FPVE. When 6,600 g of the above said monomeric mixture were fed (after about 280 min of reaction), the reaction was interrupted. The final gaseous phase had the following composition (% by moles): 82.5% TFE, 17.2% MVE, 0.3% FPVE.

Table 1 reports the data relating to the polymer characterization.

EXAMPLE 3

It was operated as in Example 1, except that at the beginning the amount of chain transfer agent introduced into the reactor was 0.95 ml/l$_{H2O}$, the amount of FPVE was 4.76 g/l$_{H2O}$, and that the monomer gaseous mixture fed during the whole reaction had a molar ratio TFE/FMVE of 21.22/1. Before starting the reaction, the gaseous phase had the following composition (% by moles): 74.5% TFE, 20.5% FMVE, 5.0% FPVE. When 6,600 g of the above said monomeric mixture were fed (after about 287 min of reaction), the reaction was interrupted. The final gaseous phase had the following composition (% by moles): 79.7% TFE, 20.0% MVE, 0.3% FPVE.

Table 1 reports the data relating to the polymer characterization.

EXAMPLE 4 (comparative)

It was operated as in Example 1, except that FPVE was not introduced into the reactor. The initial gas phase in the autoclave had the following composition (% by moles): 87.5% TFE, 12.5% FMVE. When 6,600 g of the above said monomeric mixture were fed (after about 240 min of reaction), the reaction was interrupted. The final gaseous phase had the following composition (% by moles): 87.6% TFE, 12.4% MVE.

Table 1 reports the data relating to the polymer characterization.

TABLE 1

| Compositions Properties | Example No. | | | |
|---|---|---|---|---|
| | 1 | 2 | 3 | 4(*) |
| FMVE (% weight) | 4.6 | 6.4 | 7.2 | 4.6 |
| FPVE (% weight) | 0.9 | 0.9 | 1.0 | 0 |
| Melt Flow Index (g/10') | 7 | 17.5 | 20 | 7 |
| $T_m$ (II) (°C.) | 294 | 287 | 277 | 298 |
| Properties at 200° C. | | | | |
| Elastic modulus (mPa) | 46.5 | 38 | 26.7 | 60 |
| Yield stress (MPa) | 5 | 4.7 | 2.2 | 3 |
| Breaking stress (MPa) | 8.5 | 6.5 | 6.5 | 6 |
| Properties at 250° C. | | | | |
| Elastic modulus (MPa) | 25 | 18 | 12.6 | 41 |
| Yield stress (MPa) | 3.3 | 3 | 1.2 | 2 |
| Breaking stress (MPa) | 5.3 | 3.5 | 2.8 | 3 |
| Flex Life | 3500 | 2320 | 5800 | 700 |
| Creep strain (%) | — | 6.7 | — | — |

(*)comparative

EXAMPLE 5

Following the same procedure of Example 2, 12 Kg of the same TFE/FMVE/FPVE terpolymer were prepared, having a MFI=14 g/10'. This polymer was used to coat a copper wire having a diameter of 1 mm according to the following procedure.

The polymer was pelletized and then fed to a Davis Electric® wire coating line equipped with a APV Sterling® extruder having a diameter of 38 mm and a length/diameter ratio of 30. Consequently, it was obtained an insulated cable classified as AGW 20, having a wall thickness of 0.25 mm. The cable was tested according to ASTM D-3032 standard (Cut Through Test), with a blade radius of 0.25 mm, at 200° C. and 250° C. The results are reported in Table 2, expressed in terms of the force (in Newton) necessary to cut the cable.

EXAMPLES 6–7 (comparative)

The same cable coating of Example 5 was performed using commercial FEP copolymers by Du Pont, known with the trademarks Teflon ® FEP 100 (MFI=6.6 g/10', Example 6), and Teflon® FEP 115 (MFI=15.3 g/10', Example 7). The results of the Cut Through Test are reported in Table 2.

TABLE 2

| | EXAMPLE | | |
|---|---|---|---|
| | 5 | 6(*) | 7(*) |
| MFI (g/10') | 14.0 | 6.6 | 15.3 |
| CUT THROUGH TEST (N) | | | |
| at 200° C. | 11.0 | 8.6 | 4.0 |
| at 250° C. | 8.7 | — | — |

(*)comparative

We claim:

1. Thermoprocessable tetrafluoroethylene copolymers, which consist of:

(a) from 0.5 to 13% by weight of perfluoromethylvinylether;

(b) from 0.05 to 3% by weight of one or more fluorinated monomers selected from the group consisting of:

(1)

$$R^1O-CF=CF_2 \quad (I)$$

wherein $R^1$ is selected from:

i) —$R_F$—T wherein $R_F$ is a perfluoroalkylene radical having from 2 to 12 carbon atoms and T is F, Cl or H;

ii)

$$-(CF_2-\underset{\underset{CF_3}{|}}{CF}-O)_n-(CF_2)_m-CF_3 \quad (II)$$

wherein n is a number from 1 to 4, and m is a number from 0 to 3;

iii)

$$-Z(OCF)_p(OCF_2-CF)_q-OCF_3 \quad (III)$$
$$\phantom{-Z(OCF)_p(OC}|\phantom{F_2-C}|$$
$$\phantom{-Z(OCF)_p(OCF_2)}X\phantom{-CF)_q-O}Y$$

wherein the (OCF) and (OCF$_2$—CF)
  |                |
  X                Y units are randomly distributed along the chain; X and Y are, independently from each other, —F or —CF$_3$; Z is —(CFX)— or —(CF$_2$—CFY)—; p and q, equal or different from each other, are numbers from 0 to 10; the average number molecular weight of the monomer being from 200 to 2,000;

iv)

$$-(CF_2-\underset{\underset{W}{|}}{CF}-O)_l-(CF_2)_2-(O-\underset{\underset{W}{|}}{CF}-CF_2)_t-O-CF=CF_2 \quad (IV)$$

wherein W is —Cl, —F or —CF$_3$, and l and t are numbers from 0 to 5;

v)

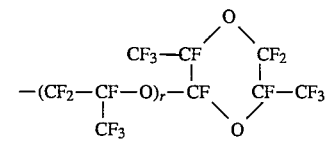

(V)

wherein r is a number from 0 to 4;

(2)

$$R^2-CH=CH^2 \quad (VI)$$

wherein $R^2$ is a —$R_F$—T group where $R_F$ is a perfluoroalkylene radical having from 2 to 12 carbon atoms, and T is F, Cl or H;

c) tetrafluoroethylene, in such an amount that the sum of the percentages of the various monomers is equal to 100% by weight.

2. Thermoprocessable tetrafluoroethylene copolymers according to claim 1, which consist of:

a) from 2 to 9% by weight of perfluoromethylvinylether;

b) from 0 to 1.5% by weight of one or more fluorinated monomers b) of claim 1;

c) tetrafluoroethylene, in such an amount that the sum of the percentages of the various monomers is equal to 100% by weight.

3. Thermoprocessable tetrafluoroethylene copolymers according to claim 1, wherein in the monomer of formula (1) (i) $R_F$ is a perfluoroalkylene radical having from 2 to 6 carbon atoms, and T is F.

4. Thermoprocessable tetrafluoroethylene copolymers according to claim 3, wherein the monomer of formula (1)(i) is perfluoropropylvinylether.

* * * * *

UNITED STATES PATENT AND TRADEMARK OFFICE
CERTIFICATE OF CORRECTION

PATENT NO. : 5,463,006

DATED : October 31, 1995

INVENTOR(S): Julio A. Abuslem et al.

It is certified that error appears in the above-identified patent and that said Letters Patent is hereby corrected as shown below:

| Column | Line | Delete | Insert |
|---|---|---|---|
| 8 | 51 | "$R^2-CH=CH^2$" | --$R^2-CH=CH_2$-- |
| 8 | 62 | "0 to 1.5%" | --0.1 to 1.5%-- |

Signed and Sealed this

Twenty-second Day of October, 1996

Attest:

BRUCE LEHMAN

*Attesting Officer*     *Commissioner of Patents and Trademarks*